(12) United States Patent
Bishop

(10) Patent No.: US 8,524,353 B2
(45) Date of Patent: Sep. 3, 2013

(54) STRUCTURAL COMPONENT

(75) Inventor: Jeffrey C. Bishop, Derby (GB)

(73) Assignee: Rolls-Royce PLC, London (GB)

( * ) Notice: Subject to any disclaimer, the term of this patent is extended or adjusted under 35 U.S.C. 154(b) by 172 days.

(21) Appl. No.: 12/988,809

(22) PCT Filed: Apr. 6, 2009

(86) PCT No.: PCT/GB2009/000898
§ 371 (c)(1),
(2), (4) Date: Oct. 21, 2010

(87) PCT Pub. No.: WO2009/138709
PCT Pub. Date: Nov. 19, 2009

(65) Prior Publication Data
US 2011/0039062 A1 Feb. 17, 2011

(30) Foreign Application Priority Data

May 13, 2008 (GB) .................................. 0808608.4

(51) Int. Cl.
*B32B 3/24* (2006.01)

(52) U.S. Cl.
USPC ................................ 428/138; 52/838; 52/846

(58) Field of Classification Search
USPC .................................... 428/138; 52/838, 846
See application file for complete search history.

(56) References Cited

U.S. PATENT DOCUMENTS

| 530,044 | A | * | 11/1894 | Haupt | .............................. 52/838 |
|---|---|---|---|---|---|
| 2,630,175 | A | | 3/1953 | Dickerman | |
| 3,378,984 | A | | 4/1968 | Quisling | |
| 5,770,320 | A | | 6/1998 | Hughes et al. | |

FOREIGN PATENT DOCUMENTS

| AU | 455075 | 10/1974 |
|---|---|---|
| DE | 1 134 557 | 8/1962 |
| DE | 1 625 462 | 7/1970 |
| DE | 297 11 917 U1 | 10/1997 |
| DE | 297 20 907 U1 | 3/1998 |
| DE | 202 12 028 U1 | 11/2002 |
| GB | 2 111 161 A | 6/1983 |
| GB | 2 364 665 B | 9/2002 |
| NL | 8600118 | 8/1987 |
| WO | WO 2008/040421 A1 | 4/2008 |

OTHER PUBLICATIONS

British Search Report dated Sep. 4, 2008 in British Patent Application No. GB0808608.4.
International Search Report dated Jun. 30, 2009 in International Patent Application No. PCT/GB2009/000898.

* cited by examiner

*Primary Examiner* — William P Watkins, III

(74) *Attorney, Agent, or Firm* — Oliff & Berridge, PLC

(57) ABSTRACT

Structural components are traditionally made by rolling or extruding to define a desired shape. Such processes lead to extra costs and inflexibility with regard to custom design. By providing a structural component comprising plates having edges extending regularly in a cruciform appropriate structural components can be provided. The plates are secured together through lock tabs passing through lock apertures and twisted into locking engagement. Either side of the locking tabs respective orientation tabs are provided to engage orientation apertures to facilitate local stability in the plates for robust locking location. Components can be formed from sheet materials and the outer profile of the components specifically shaped for particular requirements.

21 Claims, 2 Drawing Sheets

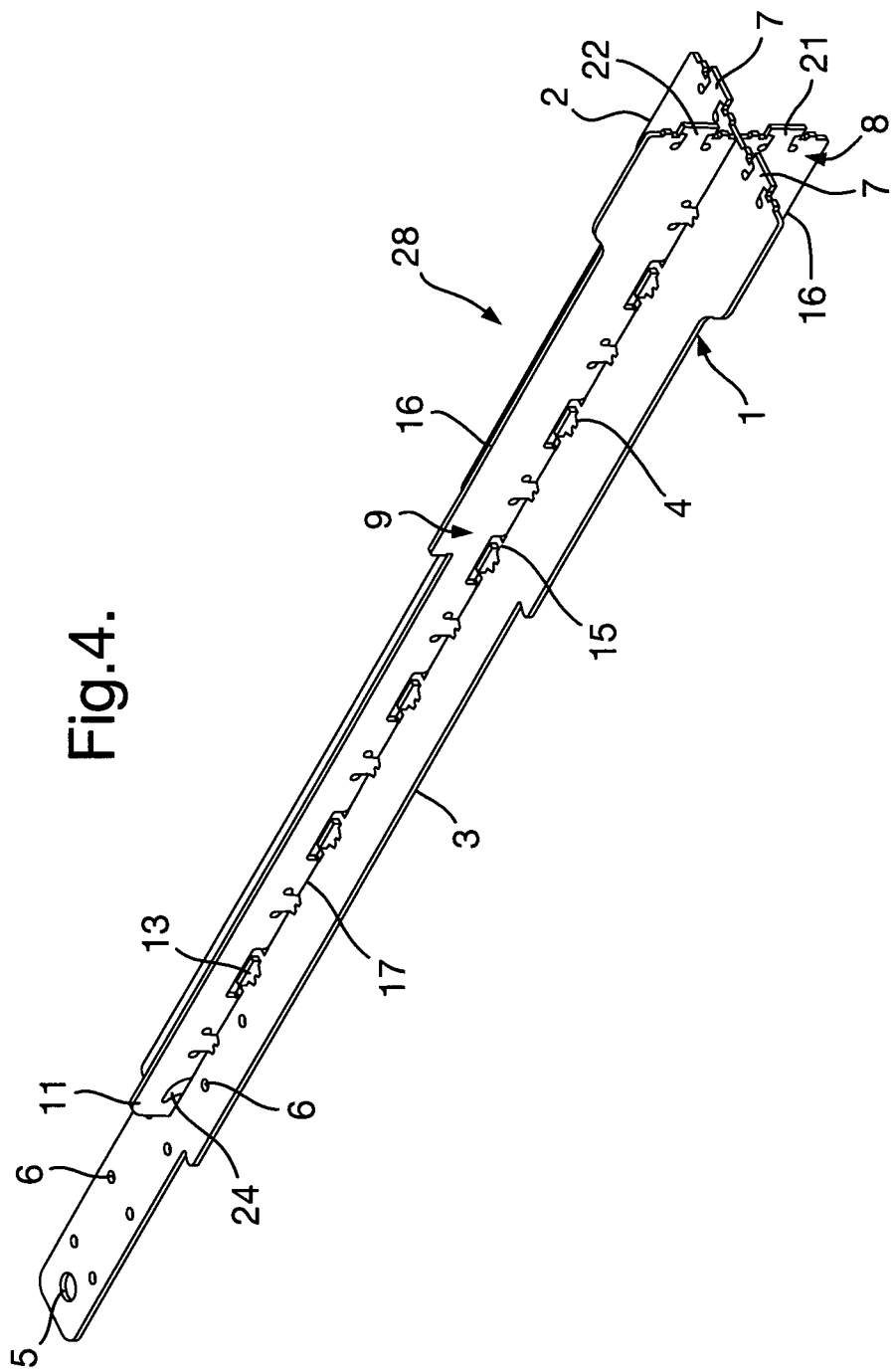

STRUCTURAL COMPONENT

The present invention relates to structural components and more particularly to structural components which combine relative rigidity with simple manufacturing techniques.

It is known to provide structural components in the form of rolled or extended section beams or components with channel sections or angled sections in order to provide rigidity. Such structural components are typically rolled or extruded during manufacturing stages and therefore can be relatively expensive to produce. Costs are particularly high when it is desirable to provide variable shaping or custom-made structural surfaces or support edges which define a profile. Custom and experimental profiling can be difficult at acceptable costs. It will also be understood that rolled I beams and channel sections must be transported in that form and therefore may not be conveniently packed for transportation.

In view of the above, normally standard off the shelf types of component section are typically used when producing a structural design. However using a length of standard section means there are further manufacturing operations necessary to achieve a desired fit, form or function within the structure as a whole. A custom designed structural component would be easier to accommodate.

In accordance with aspects of the present invention there is provided a structural component, the component characterized in that there is a core element defining an aperture row comprising at least one aperture set, each aperture set having a lock aperture and an orientation aperture, a side element having a core edge defining at least one tab set, each tab set comprising a lock tab and an orientation tab spaced to allow the lock tab to enter the lock aperture and the orientation tab to enter the orientation aperture, the lock tab having an end distortable out of alignment for retention of the lock tab in the lock aperture.

Typically, the aperture row is aligned with an axis or orientation within the core element. Generally the aperture row is arranged centrally along the length of the core element. Normally, the aperture row has a plurality of aperture sets. Generally, each aperture set comprises of an orientation aperture each side of the lock aperture.

Generally, the component has a side element either side of the core element. Typically the side elements either side of the core element have tab sets that are spaced and arranged to respectively engage alternate aperture sets in the core element.

Typically, the core element has a base with fixing tabs to allow the component to be secure to another structure. Advantageously each side element has a base with fixing tabs to allow the component to be secure to another structure.

Generally, the core element for each side element is made from a sheet material. Typically the sheet material is steel. Generally, the core element and each side element are formed by laser cutting.

Generally the edge away from the aperture row defines a shape for the component. Typically, the edge opposite the core edge defines a shape for the component.

Advantageously, the core element has a location slot and the side element has a location tab. Advantageously, where there is a side element either side of the core element one side element has a location tab in the form of an interlock and the other side element has a location tab in the form of a receptor to receive the interlock through the location slot for location of the respective side elements relative to the core element. Further advantageously, the interlock rotates into engagement with the receptor.

Typically, the distortable end of the lock tab is turned upon a stem portion. Typically, the distortable end incorporates ears to engage peripheral portions of the lock aperture for retention of the lock tab in the lock aperture.

Aspects of the present invention will now be described by way of example only with reference to the accompanying drawings in which:—

Formation of structural components is a clear necessity with respect to providing structures and assemblies for engineering or other purposes. Formation of such structural components from sheet materials has particular advantages when relatively thin sheet materials can be used. It will be understood that sheet materials are generally light but may not have sufficient stiffness in bending to meet rigidity requirements unless the sheet material is relatively thick. In such circumstances typically formed, rolled or extended components are used which urge standardization and commonality rather than custom design.

Figure 1:
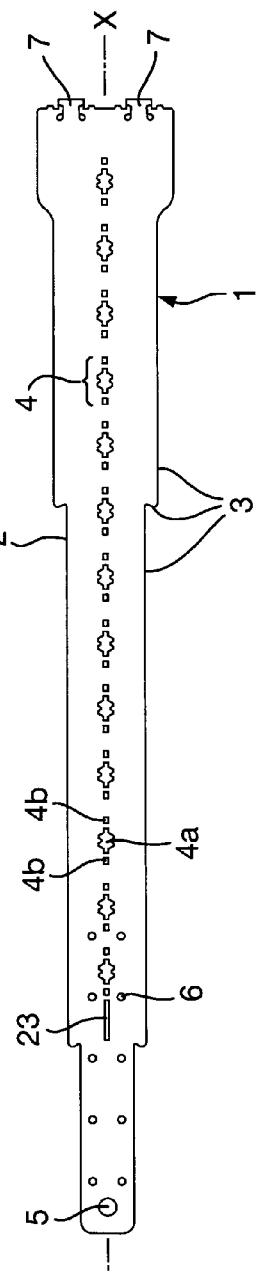
FIG. 1 is a schematic plan view of a core element in accordance with aspects of the present invention.
Figure 2:
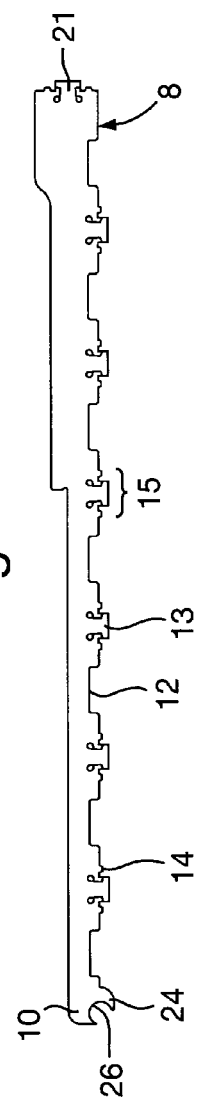
FIG. 2 is a schematic plan view of a first side element in accordance with aspects of the present invention.
Figure 3:
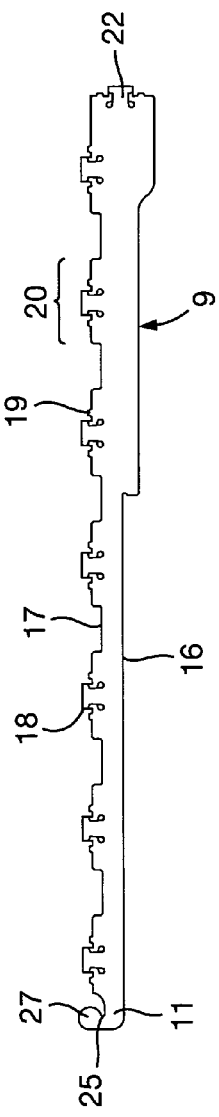
FIG. 3 is a schematic side view of a second side element in accordance with aspects of the present invention; and, FIG. 4 is a schematic perspective view of a structural component formed from the elements depicted in FIGS. 1 to 3.

Aspects the present invention provide a structural component which can be formed from sheet material and achieve high stiffness in bending and flexibility in torsion while avoiding the necessity of costly rolling and extension processes. The structural component essentially comprises a core element typically in the form of an elongate plate with side elements also in the form of plates secured to the core plates along an aperture row. FIGS. 1 to 3 illustrate respective elements of a structural component in accordance of aspects of the present invention while FIG. 4 illustrates a component in an assembled form comprising the elements shown in FIGS. 1 to 3.

FIG. 1 illustrates a core element or plate 1 shaped in order to provide a base form for a structural component in accordance of aspects of the present invention. The core element 1 is elongate and has profile edges 2, 3 away from an aperture row extending along an axis X-X. The edges 2, 3 effectively define the shape for the structural component in one axis or plane. The edges 2, 3 can be profiled or tailored to achieve a desired component shape.

An aperture row is defined by a series of aperture sets 4. Each aperture set 4 comprises a lock aperture 4a and orientation apertures 4b either side. In the embodiment depicted in FIG. 1 and this description two orientation apertures 4b are provided either side of the lock aperture 4a. However, it will be appreciated a single orientation aperture could be provided with a reduction in the strength of orientation retention and lock purchase by a lock tab as described later.

As can be seen the lock apertures 4a typically incorporate indents to retain lock tabs as will be described later. The size and shaping of the lock apertures 4a will depend upon operational requirements in terms of retention and structural strength for a component in accordance of aspects of the present invention.

The orientation apertures 4b will be generally defined or orientated with a box or rectangular shape to provide an orientation aspect to the orientation tabs as will be described later within a structural component assembly in accordance with aspects of the present of invention.

The core plate 1 as indicated is generally formed from a sheet material cut and shaped by a laser cutting process in order to define the edges 2, 3 for a final component shape and profile as well as the aperture set 4. The core plate 1 is typically formed from a metal such as steel but it will also be understand that relatively robust plastics materials may also be used.

The core plate 1 will provide the principal element or part of the structural component in accordance of aspects of the present invention. In such circumstances typically the plate 1 will also incorporate bolt holes, 5, 6 to allow other elements and structures to be secure to the plate 1 and therefore the structural component in accordance with aspects of the present invention. It will also be understood that a structural component typically requires securing to other structural elements in an appropriate assembly so the core plate 1 in a base portion incorporate fixing tabs 7 to allow the plate 1 to be secured to other structures for appropriate assembly.

The core plate 1 is generally flat so will tend to bend in the plane of FIG. 1. In such circumstances, the strength of the core plate 1 alone is determined by the material type as well as thickness of that material forming the plate 1. In accordance with aspects of the present invention side elements or plates 8, 9 are provided. These side elements or plates 8, 9 engage with the core element or plate 1 through the aperture sets 4 in order to create a robust structural component.

The side element plate 8, 9 as depicted in FIGS. 2 and 3 are shown as being substantially symmetrical except with regard to location ends 10, 11 as will be described later and position of tab sets. Thus, the respective side plates 8, 9 can be secured to the core plate 1 as required. Such location of respective plates 8, 9 either side of the core plate 1 provides a degree of profile symmetry in a final assembled structural component in accordance of aspects of the present invention. However, it may be possible to provide a design with simply one side plate to one side of the core plate in order to create a structural component adequate for or specifically designed for a particular function.

Side element plate 8 comprises a core edge 12 which is juxtaposed against the core plate 1 to one side of the row of aperture sets 4 in use. The core edge 12 is profiled to define lock tabs 13 in the form of dowels as well as orientation tabs 14. Combinations of lock tabs 13 and orientation tabs 14 define respective tab sets 15. Within each set 15 respective tabs 13, 14 are shaped and spaced to engage reciprocal lock apertures 4a and orientation apertures 4b in the aperture row of the core element or plate 1.

The lock tabs 13 are shaped and have a length such that they will enter and normally pass through the lock apertures 4a. Respective distortable end portions of the tabs 13 extend once passed through the aperture 4a to allow twisting and distortion for retention of the tab 13 within the aperture 4a when required.

The orientation tabs 14 are arranged to engage the orientation apertures 4b. The tabs 14 generally do not pass completely through the orientation apertures 4b. In such circumstances the tabs 14 maintain orientation and presentation of the side element or plate 8 in use. By entering the orientation tab apertures 4b it will be understood that the orientation tabs 14 lock a local position for the side plate 8. Thus, giving the side plate element 8 some strength against which twisting and distortion of the lock tab 13 can act despite a relatively thin profiled side plate 8.

It will be noted that the orientation tabs 14 take the form of simple stems which extend downwards for engagement with a respective orientation aperture 4b. Each lock tab 13 generally takes the form of a twistable component having a stem which extends down to the distortable end incorporating the ears. The stem is formed in the side plate 8 to allow twisting about its axis for retention within the lock aperture 4a in use and a ratchet type engagement with the detents of the aperture 4a as described previously.

Side plate 9, depicted in FIG. 3 is similar to side plate 8 in FIG. 2. An edge 16 opposite a core edge 17 has a profile in order to provide shape to the structural component when formed. The core edge 17 incorporates lock tabs 18 and orientation tabs 19 in tab sets 20. The lock tabs 18 as previously are arranged to penetrate through lock apertures 4a. The ends of the lock tabs 18 can be twisted and distorted for engagement with shoulder and detent parts of the aperture 4a for retention of the side plate 9 in use. The orientation tabs 19 again provide locking purchase adjacent to the locking tabs 18 to facilitate orientation and positioning in use.

The locking tabs 13, 18 in respective side elements 8, 9 are similarly shaped and alternatively spaced in order to enable both side plates 8, 9 to be secured to the core plate 1. Respective tab sets 15, 20 are located along the core edges 12, 17 so that alternate aperture groups formed in the core plate 1 are engaged.

Base parts of the side plates 8, 9 incorporate respective fastening or fixing tabs 21, 22 to enable the structural component once assembled to be secured to other structures or formations. The tabs 21, 22 act in association with fixing tabs 7 in the core plate 1.

Generally it is important to arrange appropriate location and orientation of the side plates 8, 9 relative to the core plate 1. In order to facilitate such location the core plate 1 incorporates a location aperture 23. The location aperture 23 allows respective location tab parts 24, 25 at a location end 10, 11 of the plates 8, 9 to pass through to provide a locating association.

The location tab elements 24, 25 generally are arranged such that they interlock. Thus, the location tab 24 comprises an interlock element that engages a receptor element 25. It will be noted that the interlock element 24 incorporates pivot surface 26 which is arranged to rotate about a curved surface 27 of the location tab part 25 so that location and orientation of the plates 8, 9 can be achieved while when assembled the tab parts 24, 25 interlock in order to provide secure location.

As with the core plate 1 it will be appreciated that the side plates 8, 9 are formed from a sheet material. Typically the shape of the plates 8, 9 is achieved through a laser cutting process. The material from which the plates 8, 9 are formed is typically a metal such as steel. Alternatively, other robust materials such as plastics may be used. It will be understood that the materials of the core plate 1 and the side plates 8, 9 can be the same or the core plate fabricated from metal while the side plates 8, 9 are formed from a plastic material or vice versa.

FIG. 4 provides a schematic perspective view of a structural component 28 in accordance with aspects of the present invention formed from the elements or plates 1, 8, 9 as described above with regard to FIGS. 1 to 3. As can be seen the assembly to form the component 28 is shown just prior to distortion or twisting of the end of lock tabs 13 in the side plate 8 and the lock tabs 18 (not shown) in side plate 9. Once the tabs 13, 18 are distorted such that ear parts are forced out of alignment with the slots 4a it will be understood that the side plates 8, 9 will be retained relative to the core plate 1.

For assembly as indicated above generally the location ends 10, 11 will be presented such that the location tab elements 24, 25 pass through the location aperture and are generally turned into an interlocked relationship about a pivot rotation at a junction between them. In such circumstances as the plates 8, 9 are generally flat and elongated the respective lock tabs 13, 18 and orientation tabs 14, 19 will come into engagement with the respective lock apertures 4a and orientation apertures 4b along the length of the core plate 1. Once presented in assembly as depicted in FIG. 4, the lock tabs 13, 18 will be turned and distorted out of alignment to retain the plates 1, 8, 9 together in a robust assembly for a structural component in accordance in the aspect of the present invention.

In the above circumstances a relatively robust component is formed. For example, the component 28 may provide a vertical pillar to present circular electrodes. Such circular edging electrodes need to be very stiff and avoid bending such that the electrodes do not wander.

A particular advantage with regard to the aspects of the present invention is that the effective peripheral profile for the component 28 is defined by the edges 2, 3, 16 while assembly is provided through the interengagement between tabs and apertures. In such circumstances it is generally easier to cut and shape the edges 2, 3, 16 for variable profiling in order to create experimental, prototype, or custom structural components in accordance with aspects of the person of invention.

By aspects of the present invention a relatively lightweight and low cost component is formed which has sufficient rigidity but which can be adapted in order to achieve complex peripheral shapes for a particular structural assembly.

Components formed in accordance with aspects of the present invention are particularly stiff in bending while retaining an ability to be flexible in torsion.

By providing the assembly with tab connector substantially along a central axis defined by an aperture row comprising aperture sets in accordance with aspects of the present invention it will be appreciated that there is a relatively low stress fixing mechanism provided giving a fatigue free performance.

As indicated above aspects of the present invention can be utilized in a number of situations where a structural component is required. It will also be understood in view of the lightweight nature of the components in accordance with the aspects of the present invention that the operational capabilities of these components may be used in clinical and surgical environments. For example, a surgical bone marrow implant can be provided which has torsional flexibility, beam stability and an adhesive friendly profile. A crucifix section defined by the plates 1, 8, 9 leads to a smaller volume and a cylindrical prism and therefore reduces any effect of localized bone marrow reduction. Furthermore, it will also be understood that the ability to more easily shape the edges 2, 3, 16 it may be easier to provide emergency prosthetic components.

As illustrated typically the aperture row within the core plate will extend centrally along one axis. However, it will also be understood that where shaping requires the aperture row and therefore the position of the side plates can be adjusted towards one edge or the other. Similarly several aperture rows can be provided for respective side plates secured in accordance with aspects of the present invention when a particular component shape requires.

Modifications and alterations to aspects of the person of invention will be appreciated by those skilled in the technology. Thus, for example edges of the plates may be serrated or shaped to be curved or otherwise formed for consistency with a desired profile envelope. Furthermore, rather than simply depending upon twisting of the lock tabs it will also be understood that some adhesive or fastening techniques such as welding may be provided subsequent to assembly and location with twisting of the lock tabs.

The invention claimed is:

1. A structural component, comprising:
   a core element defining an aperture row that includes a plurality of aperture sets, each aperture set having a lock aperture and an orientation aperture disposed on either side of the lock aperture; and
   first and second side elements each having a core edge defining a plurality of tab sets, each tab set including a lock tab and an orientation tab spaced to allow the lock tab to enter the lock aperture and the orientation tab to enter the orientation aperture, the plurality of tab sets of the first side element being staggered relative to the plurality of tab sets of the second side element, each lock tab having an end that is configured to be distortable out of alignment for retention of the lock tab in the lock aperture, each orientation tab and aperture being configured to maintain orientation and to lock a local position of the side element.

2. The component as claimed in claim 1, wherein the aperture row is aligned with an axis or orientation within the core element.

3. The component as claimed in claim 1, wherein the aperture row is arranged centrally along the length of the core element.

4. A structural component, the component comprising:
   a core element defining an aperture row, the aperture row including at least one aperture set, each aperture set having a lock aperture and an orientation aperture; and
   first and second side elements each disposed on either side of the core element, the first and the second side element having a core edge defining a plurality of tab sets, each tab set including a lock tab and an orientation tab spaced to allow the lock tab to enter the lock aperture and the orientation tab to enter the orientation aperture, the plurality of tab sets of the first side element being staggered relative to the plurality of tab sets of the second side element, each lock tab having an end that is configured to be distortable out of alignment for retention of the lock tab in the lock aperture, each orientation tab and aperture being configured to maintain orientation and to lock a local position of the side element.

5. The component as claimed in claim 4, wherein the aperture row is arranged centrally along the length of the core element.

6. The component as claimed in claim 5, wherein the aperture row has a plurality of aperture sets.

7. The component as claimed in claim 6, wherein each aperture set includes an orientation aperture each side of the lock aperture.

8. The component as claimed in claim 4, wherein the side elements either side of the core element have tab sets that are spaced and arranged to respectively engage alternate aperture sets in the core element.

9. The component as claimed in claim 4, where the core element has a location slot and each side element has a location tab.

10. The component as claimed in claim 9, wherein one side element has a location tab in the form of an interlock and the other side element has a location tab in the form of a receptor to receive the interlock through the location slot for location of the respective side elements relative to the core element.

11. The component as claimed in claim 9, wherein one side element has a location tab in the form of an interlock and the other side element has a location tab in the form of a receptor to receive the interlock through the location slot for location of the respective side elements relative to the core element.

12. The component as claimed in claim 10, wherein the interlock rotates into engagement with the receptor.

13. The component as claimed in claim 1, wherein the core element has a base with fixing tabs to allow the component to be secure to another structure.

14. The component as claimed in claim 1, wherein each side element has a base with fixing tabs to allow the component to be secure to another structure.

15. The component as claimed in claim 1, wherein the core element and the side element are made from a sheet material.

16. The component as claimed in claim 11, wherein the sheet material is steel.

17. The component as claimed in claim 1, wherein the core element and the side element are formed by laser cutting.

18. The component as claimed in claim 1, wherein the edge away from the aperture row defines a shape for the component.

19. The component as claimed in claim 1, wherein the edge opposite a core edge defines a shape for the component.

20. The component as claimed in claim 1, wherein the distortable end of the lock tab is turned upon a stem portion.

21. The component as claimed in claim 1, wherein the distortable end incorporates ears to engage peripheral portions of the lock aperture for retention of the lock tab in the lock aperture.

* * * * *